(12) United States Patent
Wang et al.

(10) Patent No.: US 7,277,447 B2
(45) Date of Patent: Oct. 2, 2007

(54) ONBOARD RAM BASED FIFO WITH POINTERS TO BUFFER OVERHEAD BYTES OF SYNCHRONOUS PAYLOAD ENVELOPES IN SYNCHRONOUS OPTICAL NETWORKS

(75) Inventors: James Wang, San Jose, CA (US); Anurag Nigam, San Francisco, CA (US); David R. Stiles, Los Gatos, CA (US)

(73) Assignee: Redback Networks Inc., San Jose, CA (US)

( * ) Notice: Subject to any disclaimer, the term of this patent is extended or adjusted under 35 U.S.C. 154(b) by 1079 days.

(21) Appl. No.: 09/823,293

(22) Filed: Mar. 30, 2001

(65) Prior Publication Data

US 2002/0141456 A1    Oct. 3, 2002

(51) Int. Cl.
*H04L 12/56* (2006.01)
(52) U.S. Cl. .................. 370/412; 370/539; 370/542
(58) Field of Classification Search ........ 370/412–419, 370/463, 428, 503, 532, 539, 542; 710/22–23; 709/213–215
See application file for complete search history.

(56) References Cited

U.S. PATENT DOCUMENTS

| | | | | |
|---|---|---|---|---|
| 5,257,261 A | * | 10/1993 | Parruck et al. | 370/522 |
| 5,331,641 A | * | 7/1994 | Parruck et al. | 370/506 |
| 5,559,969 A | * | 9/1996 | Jennings | 710/307 |
| 6,449,666 B2 | * | 9/2002 | Noeldner et al. | 710/23 |
| 6,502,197 B1 | * | 12/2002 | Raza | 713/400 |
| 6,580,731 B1 | * | 6/2003 | Denton | 370/539 |
| 6,631,130 B1 | * | 10/2003 | Roy et al. | 370/352 |

OTHER PUBLICATIONS

Hamlin et al, "A SONET/SDH Overhead Terminator for STS-3, STS-3C, and STM-1", 1993, IEEE.*

* cited by examiner

*Primary Examiner*—Doris H. To
*Assistant Examiner*—Habte Mered
(74) *Attorney, Agent, or Firm*—Blakely, Sokoloff, Taylor & Zafman, LLP

(57) ABSTRACT

An on-chip RAM FIFO (first-in-first-out) buffer for storing SPE overhead bytes wherein each entry of the RAM FIFO stores (1) a byte of the SPE overhead; (2) an indication of which byte of the SPE overhead is currently stored in that entry; and (3) an indication of which STS signal that byte was taken from.

17 Claims, 9 Drawing Sheets

Transport Overhead

| | | |
|---|---|---|
| Framing<br>A1 | Framing<br>A2 | STS-1 ID<br>C1 |
| BIP-8<br>B1 | Orderwire<br>E1 | User<br>F1 |
| Data Com<br>D1 | Data Com<br>D2 | Data Com<br>D3 |
| Pointer<br>H1 | Pointer<br>H2 | Pointer Action<br>H3 |
| BIP-8<br>B2 | APS<br>K1 | APS<br>K2 |
| Data Com<br>D4 | Data Com<br>D5 | Data Com<br>D6 |
| Data Com<br>D7 | Data Com<br>D8 | Data Com<br>D9 |
| Data Com<br>D10 | Data Com<br>D11 | Data Com<br>D12 |
| Growth<br>Z1 | Growth/FEBE<br>Z2 | Orderwire<br>E2 |

The first three rows are Section Overhead; the remaining rows are Line Overhead.

*FIG.2*
*(Prior Art)*

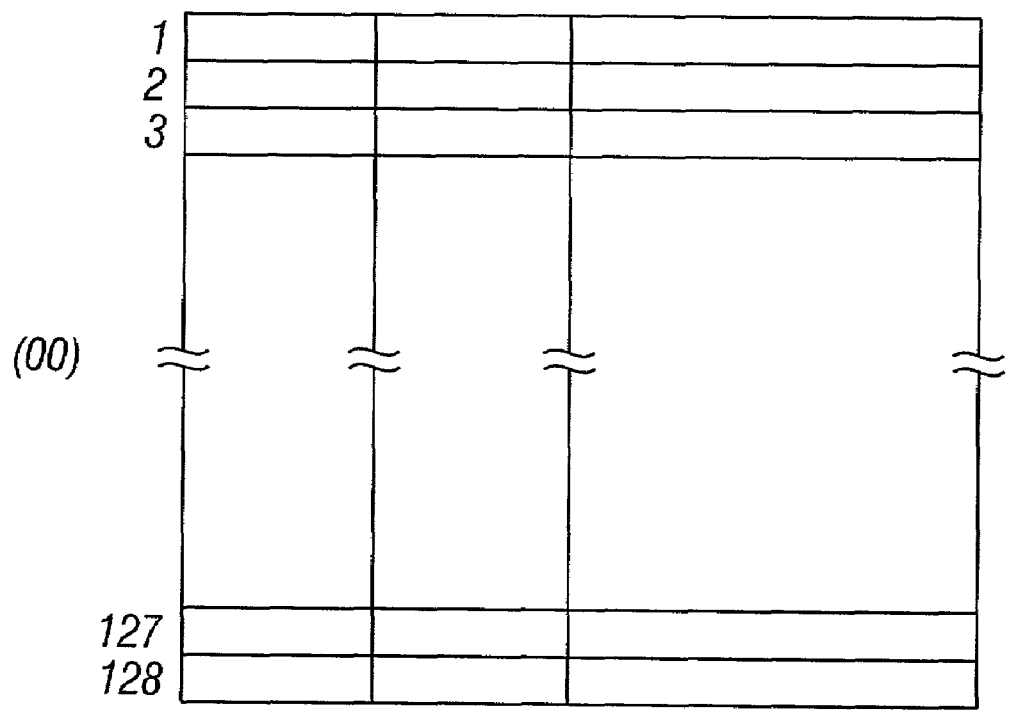
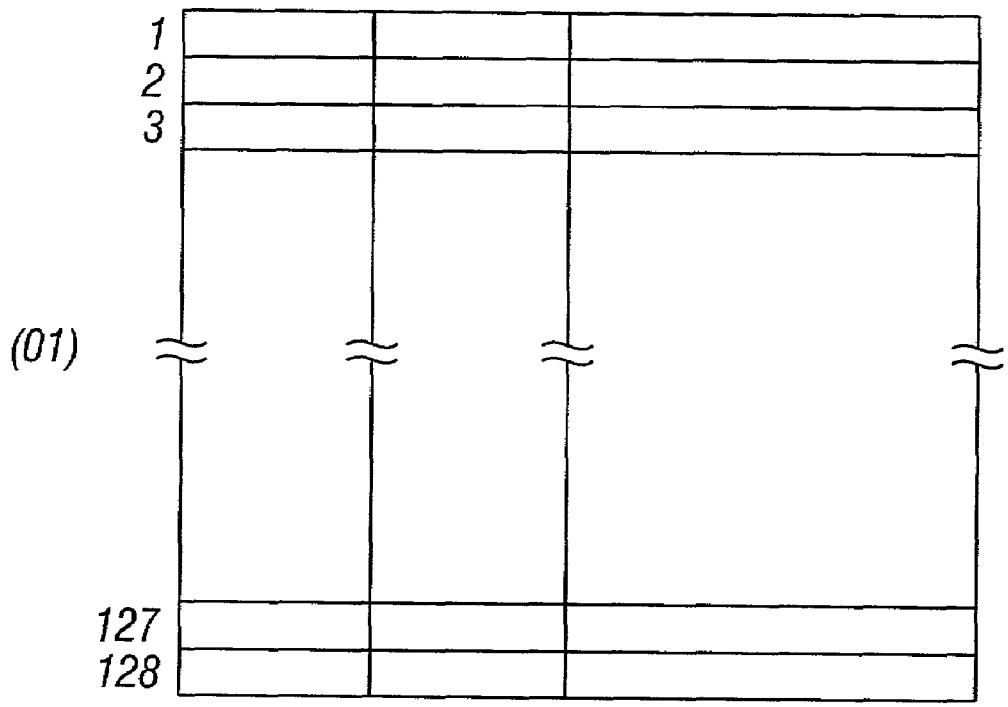
FIG. 8A

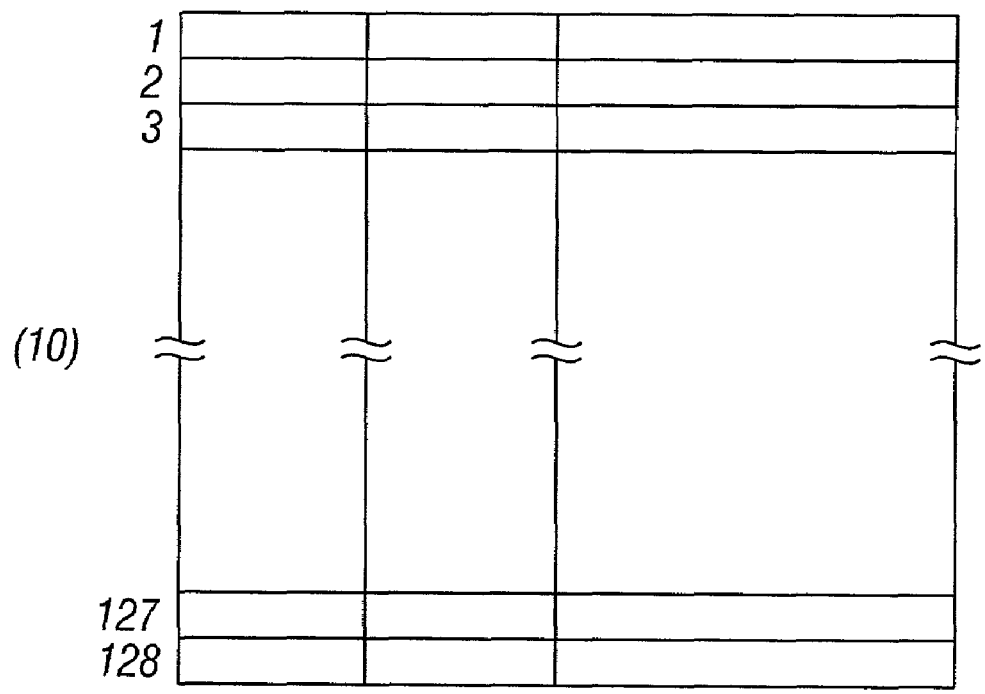
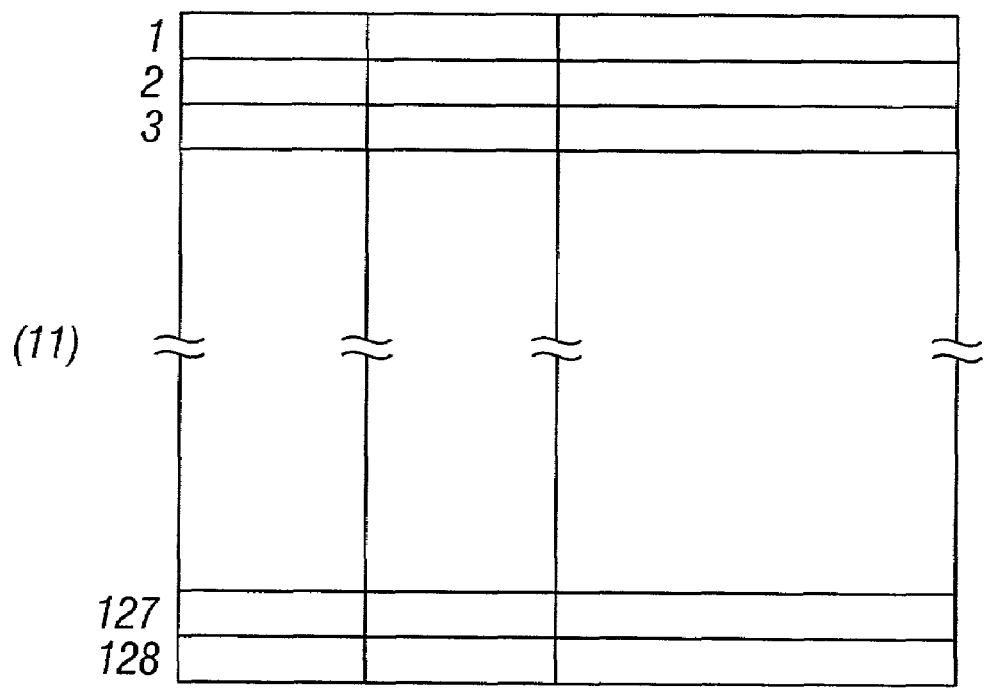
FIG. 8B

ONBOARD RAM BASED FIFO WITH POINTERS TO BUFFER OVERHEAD BYTES OF SYNCHRONOUS PAYLOAD ENVELOPES IN SYNCHRONOUS OPTICAL NETWORKS

FIELD OF THE INVENTION

The present invention relates to synchronous optical networks (SONET), and more particularly, to a new method and device for buffering path overhead (POH) bytes of synchronous payload envelopes (SPE) within SONET frames.

BACKGROUND OF THE INVENTION

SONET is one of the predominant transmitting and multiplexing standards for high-speed signals used in communications and computer networks today. The SONET protocol and architecture formats data into high-speed frames having a standard number of bytes. The basic building block of a SONET digital transmission system is a synchronous transport level one, or STS-1, frame which consists of 9 rows by 90 columns of bytes, for a total of 810 bytes. The frames are transmitted at a rate of 8,000 frames per second (or once every 125 microseconds) to provide a 51.84 Mbps signal rate. The STS-1 frame is transmitted one row at time, from top to bottom, and from left to right within each row. Therefore, the byte in row 1, column 1 is sent first, and the byte in row 9, column 90 is sent last. After the 90th byte is sent at the end of row 1, the next byte sent is the first byte in row 2, the byte in column 1. Because one frame is sent every 125 microseconds, SONET can maintain time-slot synchronization that is required for delivery of PCM voice data (8 bits at 8,000 times per second or 64 kbps). SONET also adheres to frame synchronization time with asynchronous network standards such as DS-1, E-1, and DS-3.

Higher rate SONET formats essentially follow the same format of the STS-1 protocol. All SONET frames contain exactly nine rows and are transmitted at 8,000 times per second. The only variable is the number of columns, or subcolumns. For example, an STS-3 frame consists of 9 rows and is sent 8,000 times per second; however, an STS-3 frame is not 90 columns wide, but is three times wider. Therefore, the STS-3 frame is 270 columns wide and its corresponding transmission rate is 155.52 Mbps. The STS-3 overhead columns are multiplied by three a well, as are the SPE capacity columns. Typically, the STS-3 frame comprises three STS-1 signals interleaved as alternating columns within the STS-3 frame. Therefore, the first column of the STS-3 frame is the first column of a first STS-1 signal, the second column of the STS-3 frame is the first column of a second STS-1 signal, and so on. Similarly, higher order STS-N formats (e.g., STS-12, STS-48, etc.) have proportionally wider frame formats containing a greater number of interleaved columns and faster bit transmission rates.

FIG. 1 illustrates the data format for a SONET STS-1 frame 100 having 9 rows by 90 columns of bytes (otherwise referred to as "octets"). The first three columns 102 are allocated for transport overhead (TOH) information which includes section overhead (SOH) and line overhead (LOH) data. As is known in the art, SOH data deals with the transport of an STS frame across the physical medium and controls functions such as framing the SONET data stream, scrambling and error monitoring. The LOH data deals with the reliable transport of the payload between line terminating equipment. FIG. 2 illustrates a typical format for the transport overhead portion of the STS-1 frame of FIG. 1 consisting of 27 octets (9 rows×3 columns). As shown in FIG. 2, the first three rows of the three transport overhead columns provide nine octets that are allocated for SOH data and includes information such as: framing octets (A1, A2); STS-1 ID number (C1); section error monitoring (B1); section orderwire channel (E1); section user channel (F1); and section data communication channels (D1-D3). The remaining six rows of the three transport overhead columns include eighteen octets that are allocated for LOH information which includes: STS-1 pointer offset (H1, H2); STS-1 pointer action byte (H3); line error monitoring (B2); automatic protection switching channel (K1, K2); line data communication channel (D4-D12); growth (Z1, Z2); and line orderwire (E2).

The remaining 87 columns of the STS-1 frame consist of 783 octets (9 rows×87 columns) that are allocated for "user" data, otherwise referred to as the "payload." Referring again to FIG. 1, the structure of the payload is defined by a synchronous payload envelope (SPE) 200 which contains 783 octets of data and is transmitted at 8,000 times per second. The first column 210 of SPE 200 contains additional overhead information, commonly referred to as path overhead (POH) data, as well as the actual user data. The POH data 210 is stored in one "column" or nine bytes of the SPE. The first POH byte indicates the first byte of the SPE. FIG. 3 illustrates a typical data format for path overhead data 210 (FIG. 1) contained within an SPE. The POH data is used to monitor and manage the transport of network services such as DS1 or DS3, for example, between path terminating equipment (PTE) and includes information such as: path trace (J1); path error monitoring (B3); path signal label (C2); path status (G1); path user channel (F2); multiframe indicator (H4); and growth/future use (Z3-Z5).

In a perfect world, it would make sense to assign the first byte of the SPE as the 4th byte in row 1 of the STS-1 frame so that the SPE is aligned with the overall SONET frame structure. However, in reality, the clocks used in networks to time bit streams do not always cooperate and remain perfectly synchronized. Factors such as jitter and phase differences make it difficult to fix the SPE inside the SONET frame in all cases and at all times. The SPE, therefore, does not have to be aligned with the first row and fourth column of the SONET frame. Consequently, the POH can begin at any byte position within the SPE capacity which typically results in the SPE overlapping into the next frame. FIG. 4 illustrates how a SPE may be mapped into a SONET frame when there are phase differences between the incoming and outgoing payloads. In other words, the SPE determines how the customer's data is carried on the SONET system.

Because the SPE can begin at any position within the information payload section of the frame, a mechanism is necessary to locate the SPE at the receiving side of the SONET link. This mechanism is provided by bytes designated as pointer bytes H1 and H2 and pointer action byte H3 contained within the LOH section of the transport overhead data discussed above. The H1 and H2 pointers are comprised of one byte each and are used to indicate the offset between the pointer bytes themselves and the beginning of the SPE. Therefore, the H1 and H2 pointers allow for the dynamic alignment of the SPE within the allowable capacity of the envelope itself. The protocol governing the values and functions of bit positions within the pointers to indicate the SPE start position is well-known in the art and need not be repeated here. Suffice it to say that the H1 and H2 pointer bytes always point to the first byte of the SPE, which is the start of the POH bytes as well.

The pointer action byte H3 is allocated to compensate for the SPE timing variations mentioned above. In the course of otherwise normal operation, the arriving SPE data rate will exceed the frame capacity. This means that within a 125-microsecond period, more than 783 bytes may be ready to be sent out in an SPE. If this excess were to be less than 8 bits, the extra bits would be just buffered sequentially and sent out as the first bits of the next frame; however, when a full byte (8 bits) has accumulated in the buffer, the pointer action byte is used to carry the "extra" byte. This is called a negative timing justification and is governed by strict rules of SONET equipment operation. Conversely, a positive time justification is used when 783 bytes are not in the CPE buffer to fill the SPE exactly.

The H3 byte is provided in all STS-1 signals within an STS-N signal. The value contained in this byte, when it is not used to carry SPE data during a negative justification is not defined and, hence, ignored. The H1 and H2 pointer bytes tell the receiver when the H3 byte is used for useful information. This byte is necessary due to the variations in timing across different service provider's networks or when CPE clocking feeds a SONET link. The mechanism of "floating SPEs" with the H1, H2 and H3 bytes is complex and many service providers desire to minimize its use. Many of these service providers lock the value of the H1 and H2 bytes to 522 (20A in hex), which points to row 1, column 4 of the next SONET frame. This method of "locking" the SPE to a fixed position in the STS-1 frame minimizes pointer justifications, but increases buffer requirements and management in the face of continued timing jitter.

In addition to user data, the SPE contains path overhead (POH) bytes. These are processed at SONET STS-1 terminating equipment because they travel as part of the payload envelope and are processed everywhere it is processed. The SPE contains nine bytes of POH. These bytes form a "column" in the SPE portion of the SONET frame, meaning the POH bytes are always in a column. However, because the position of the SPE can "float" within the STS-1 frame Information Payload area, the position of the POH bytes can float as well. As mentioned above, the functionality and operation of the POH data is well known in the art and, hence, need not be further described herein.

Because the POH data is vital to the function of monitoring and managing the transport of various services such as DS1, DS3, ATM, etc. between path terminating equipment, it is desirable to buffer the POH data for processing with software and/or hardware mechanisms during SONET frame transmission. Using the pointers H1 and H2, and the pointer action byte H3, of the LOH data described above, the start of the SPE and hence the start of the POH may be adjusted and monitored even when their positions vary within a frame due to synchronization errors or timing jitters. Once the start of the POH is determined, the positions of the remaining bytes of the POH within a SPE can be calculated. For higher rate STS frames (e.g., STS-3, STS-12, STS-48, etc.), the start of more than one SPE may be defined within a single frame. For example, in a STS-3 frame, three separate SPEs may begin at three distinct byte positions within the payload area of a frame. Additionally, there will be three separate sets of SOH and LOH data within the STS-3 frame. Each set of LOH data will contain the pointers H1 and H2 to point to a corresponding starting position of POH data and a SPE. After these starting positions are determined, the remaining byte positions of each POH can be calculated.

Different bytes in the overhead of SONET frames are handled with different mechanisms. With regard to certain of those bytes, the prior art uses one of the two following buffering techniques. For an SPS-48 SONET signal, for example, a first technique utilizes two sets of 48×9 byte buffers implemented on a single chip. Additionally, there is a bus from the chip to a field programmable gate array (FPGA). These double buffers are operated in a "ping pong" fashion such that when data is being written into one of the buffers, data is being read from the other buffer, and vice versa. Hardware elements switch between the two buffers at the end of each SONET frame (i.e., every 125 microseconds). When a read operation from a first buffer is performed, the bus is used to transport the contents of the first buffer into the FPGA for processing. A processor then accesses the resulting data from the FPGA for further processing. At the same time, the second buffer is switched to receive incoming POH bytes corresponding to a second frame. The above process repeats for the second buffer and SPE overhead bytes are written into and read from each of two buffers in alternating read and write operations.

One of the primary disadvantages with the above-described prior art technique of implementing dual buffers is its difficulty, or inability, to detect and properly store, transport and process POH bytes when positive and/or negative timing justifications effect the number of POH bytes contained in one SONET frame. As described above, due to synchronization jitters and timing variations between path terminating equipment (PTE), SPEs and their respective POH bytes are not exactly aligned with the bytes of a single SONET frame. Rather, the SPE's and POH bytes typically "float" within two SONET frames. Therefore, pointers H1 and H2, and pointer action byte H3, are used to compensate for these timing variations and perform negative timing justifications and positive timing justifications, as necessary. As a result of performing these negative and positive timing justifications, a condition occasionally arises in which a SONET frame will contain either eight POH bytes or ten POH bytes of a STS-1 signal, instead of the normal nine bytes. This condition is known in the art and is referred to herein as a "corner case" condition. Recall that the switching between the two buffers is synchronized with SONET frame transmission time rather than with SPE transmission times. However, the transmission of SPEs and POHs is not necessarily aligned with the transmission of SONET frames. Thus, for example, if a SONET frame contains only eight POH bytes of a respective SPE, only those eight POH bytes are written to one of the dual buffers during a write operation. Therefore, the processor must recognize there is a missing POH byte and update that POH byte. If the SONET frame contains ten POH bytes, there is a possibility that the tenth POH byte, which may be the first POH byte of the next SPE, will overwrite the first POH byte of the current SPE. Thus, a miscorrelation of path overhead data and user data may occur, adding to the complexity of processing user data.

Another disadvantage with the above-described prior art approach is its lack of flexibility in buffering the POH bytes. For example, hardware elements may sometimes process some or all of the necessary POH bytes of a respective SPE. Therefore, only a few, or none, of the POH bytes for that SPE may need to be buffered for further processing by software mechanisms. Regardless of this condition, the dual-buffer technique still stores all POH bytes of a SPE within a respective buffer even when some or all of them need not be processed. This is an inefficient utilizing of buffer memory.

In addition to the disadvantages described above, further limitations of this system include: (1) the requirement of an FPGA; (2) two sets of buffers require more space on the chip and increase chip costs; (3) the two set of buffers are not accessible by the CPU; and (4) a dedicated bus is required to transport data from the chip to the FPGA. All of these disadvantages add to the cost and complexity of this prior art method of buffering and processing overhead data.

To overcome the disadvantages of the above-described prior art technique, a second prior art technique uses only one 48×9 byte buffer. However, this buffer is partitioned into a first 48×4 byte buffer (referred to herein as the "upper buffer") and a second 48×5 byte buffer (referred to herein as the "lower buffer"). Each of the forty eight columns of the upper buffer corresponds to a respective STS-1 signal interleaved in the STS-48 signal. Each column of the upper buffer stores the first four POH bytes of a respective SPE. Similarly, each of the forty eight columns of the lower buffer store the last five POH bytes of the respective SPE contained within the STS-48 frame.

Referring to FIG. 5A, a block diagram of a 48×4 byte upper buffer is illustrated. Each column of the upper buffer stores the first four POH bytes of a respective SPE. A flag is associated with each set of four bytes of SPE overhead data. FIG. 5B illustrates an exemplary 48-bit flag buffer used to indicate when particular columns of the upper buffer are full. When the first four bytes of POH of a SPE are stored in a column of the upper buffer, a flag is set and stored in a corresponding position of the flag buffer to indicate the availability of the first four bytes of POH data for processing. Similarly a second 48-bit flag buffer (not shown) is used to indicate when particular columns of the lower buffer (not shown) are full (i.e., contain the last five POH bytes of a respective SPE).

In order to read the POH bytes stored in the upper and lower buffers, software periodically polls (e.g., every 32 microseconds) the first and second flag buffers. In one embodiment, a microprocessor reads and automatically clears each flag from the flag buffers. In this way, the latency period between the time the flag buffer is read and the time when the flag buffer is ready for storing flags for a next read cycle is minimized. For each location of the first and second flag buffers in which a flag is set, the corresponding columns of the upper and lower buffers will be accessed for processing. Because the first four POH bytes of a respective SPE will always be available before the last five POH bytes, the POH bytes of a single SPE are typically read in a toggle fashion wherein the first four POH bytes of the SPE are read in a first read operation and the last five POH bytes of the SPE are read in a later read operation. Additionally, since any set of four POH bytes or five POH bytes of different SPEs may be available individually and irrespective of the availability of POH bytes of other SPEs, the timing associated with receiving and processing POH bytes is not based on SONET frame transmission time. Thus, the "corner case" condition caused by timing justifications experienced by the dual-buffer, prior art methodology is largely eliminated in this prior art solution.

A primary disadvantage of this second prior art technique, however, is that it requires extensive processing by a microprocessor to handle the polling of flags and the processing of the bytes in their respective buffers. Additionally, each of the POH bytes must be mapped into their corresponding locations within the upper (48×4) or lower (48×5) buffers. As the data rate increases (e.g., STS-48 and STS-192) the burden on the processor increases to keep track of the incoming POH bytes by checking the corresponding flags within the flag buffers, calculating buffer locations, and reading buffer and processor data. All of the above functions must be performed within specified time limits to avoid data overflow problems. Thus a primary limitation of this technique includes the processing power of microprocessor.

Similar to the first prior art technique described above, this second prior art approach also suffers from its lack of flexibility in buffering the POH bytes. Even if only a few, or none, of the POH bytes of one or more SPEs are desired for processing, all the POH bytes of all SPEs are eventually stored in corresponding columns of the upper and lower buffers. This is inefficient.

Thus, there is a need for an improved method and system for buffering overhead bytes of SPE's within SONET frames which overcome the limitations of the prior art methods and systems.

SUMMARY OF THE INVENTION

The invention addresses the above and other needs by providing an improved method and system for buffering SPE overhead data. The invention implements an on-chip RAM FIFO (first-in-first-out) buffer wherein each entry of the FIFO stores (1) a byte of the SPE overhead; (2) an indication of which byte of the SPE overhead is currently stored in that entry; and (3) an indication of which STS frame/signal that byte was taken from. In one embodiment, two pointers are used to track the "head" and "tail" of a specified complete set of entries in the RAM. In one embodiment, the RAM consists of 128 entries, each entry being 16 bits in storage capacity. In a further embodiment the RAM FIFO is implemented as four parallel buffers, each buffer containing 128 entries, each entry containing 16 bits of storage capacity. Software periodically checks the "head" and "tail" pointers to determine the available number of entries in the FIFO. Thus, the software need not poll flag bits of different buffers to determine when those buffer entries need to be accessed; rather in this technique the software can merely check the head and tail pointers. In one embodiment, the head and tail pointers are implemented as hardware counters that are incremented each time an entry is read from the FIFO or written into the FIFO, respectively. In one embodiment, when hardware detects that there a specified number (N) of entries in the FIFO, hardware will send an interrupt signal to the processor to tell it to read the FIFO. Alternatively, software can periodically poll (e.g., every 100 microseconds) the pointer values to determine an appropriate time to read the FIFO. In a further embodiment, the invention allows for burst readings of the RAM (DMA transfers) to rapidly read the contents of the buffer. In yet another embodiment, software can program which POH bytes of particular SPEs within the SONET frame will be stored in the FIFO. Thus, for example, if only the first three POH bytes of the SPEs corresponding to the first ten STS-1 signals within a STS-48 signal, are desired for processing by software, appropriate software programming may be implemented to store only those desired POH bytes in the RAM FIFO. Thus, the invention provides flexible buffering of POH bytes on an as needed, or as desired, basis. Furthermore, because POH bytes from different SPEs within a frame are stored into the RAM FIFO sequentially, one byte at a time, in the order that they are received from the SONET frame, the invention eliminates the "corner case" justification errors discussed above. Finally, because the method and system of the invention require less hardware than prior art methods and systems, the invention provides less expensive network components and devices.

BRIEF DESCRIPTION OF THE DRAWINGS

FIG. 2 illustrate a prior art data format for the Transfer Overhead section of the frame of FIG. 1.

FIG. 8 illustrates four RAM FIFO buffers for storing POH information, in accordance with another embodiment of the invention.

DETAILED DESCRIPTION OF THE PREFERRED EMBODIMENTS

The invention is described in detail below with reference to the figures wherein like elements are referenced with like numerals throughout. The invention comprises a novel apparatus and method for buffering SPE path overhead bytes in a SONET data stream. The following description is presented to enable any person skilled in the art to make and use the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
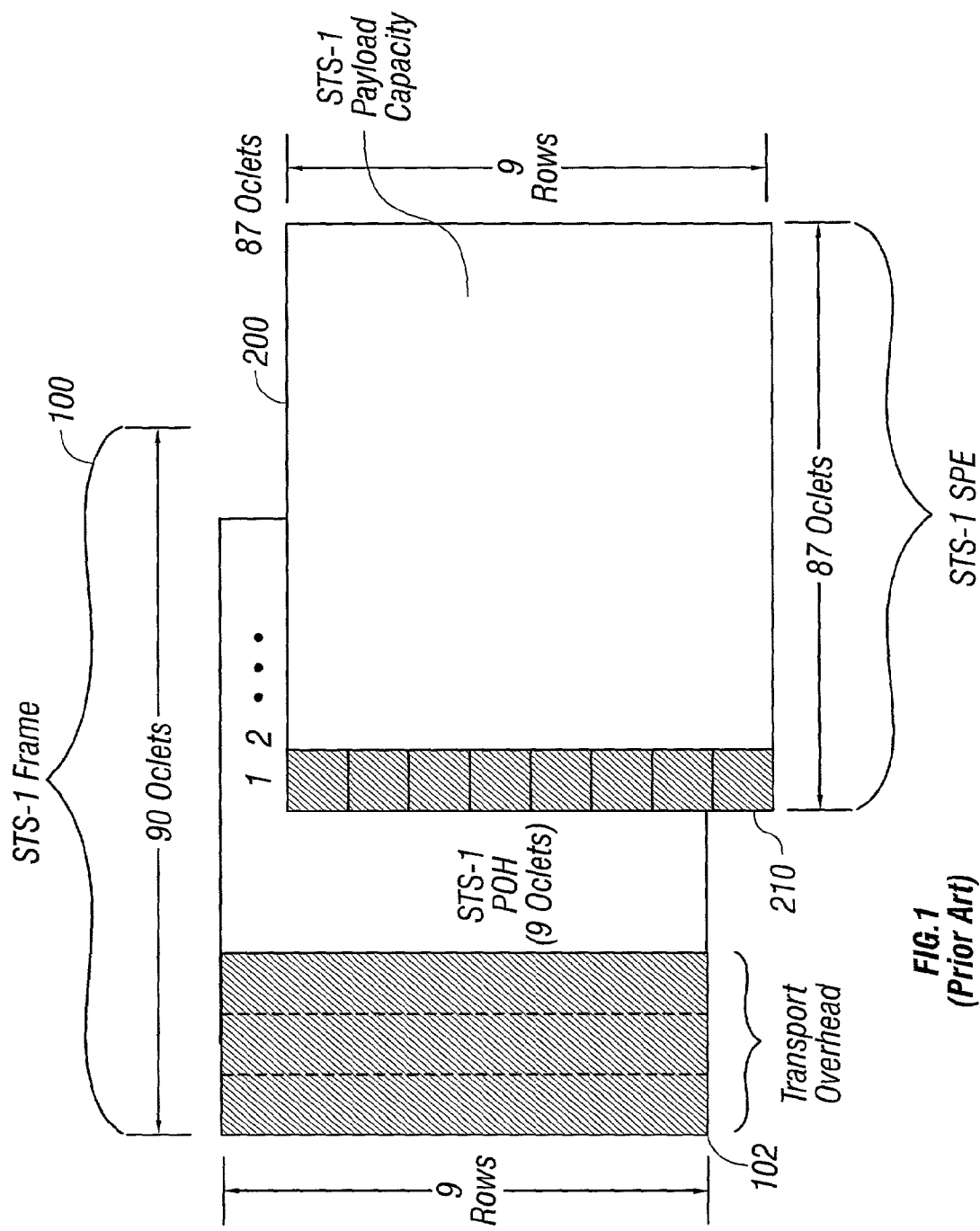
FIG. 1 illustrates a prior art data format for a SONET STS-1 frame having 9 rows by 90 columns of bytes.
Figure 3:
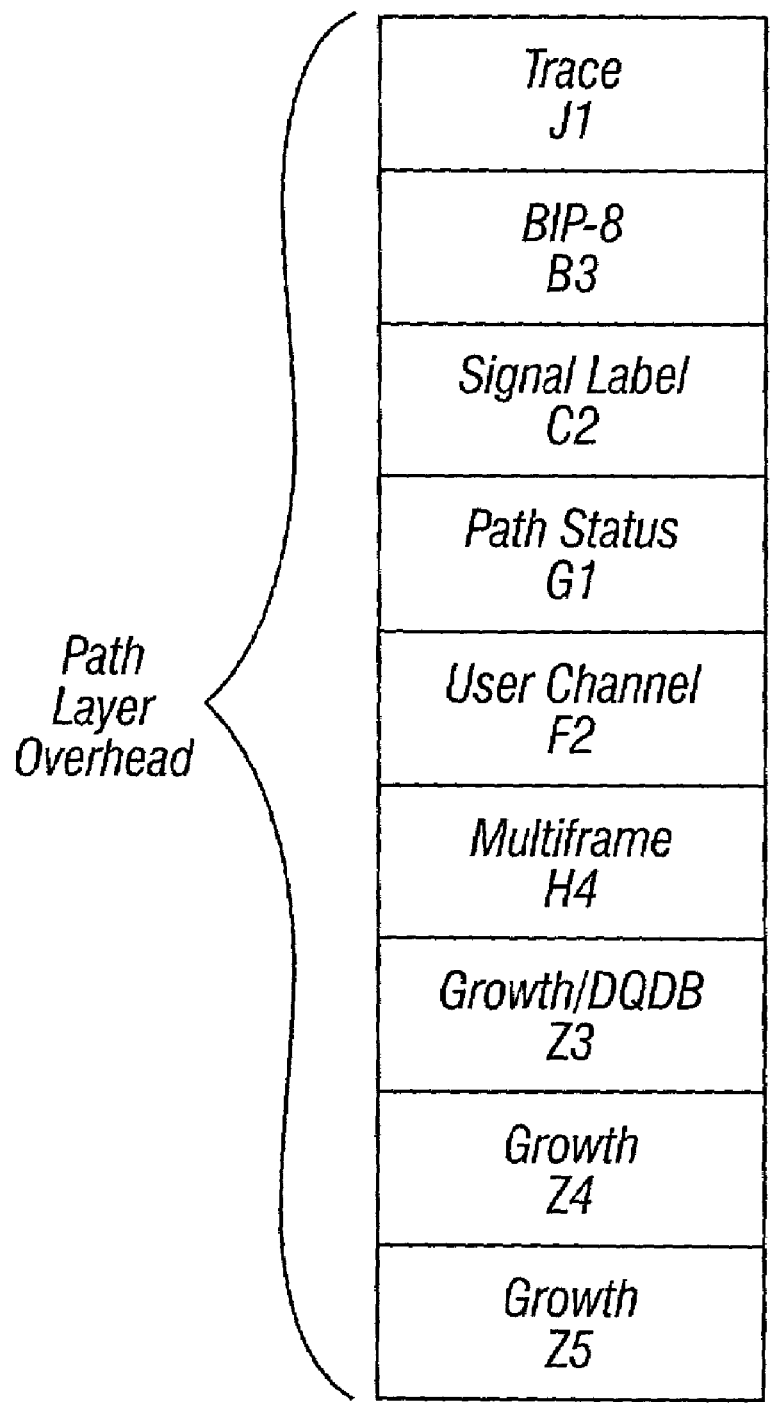
FIG. 3 illustrates a prior art data format for the Path Overhead bytes within a SPE.
Figure 4:
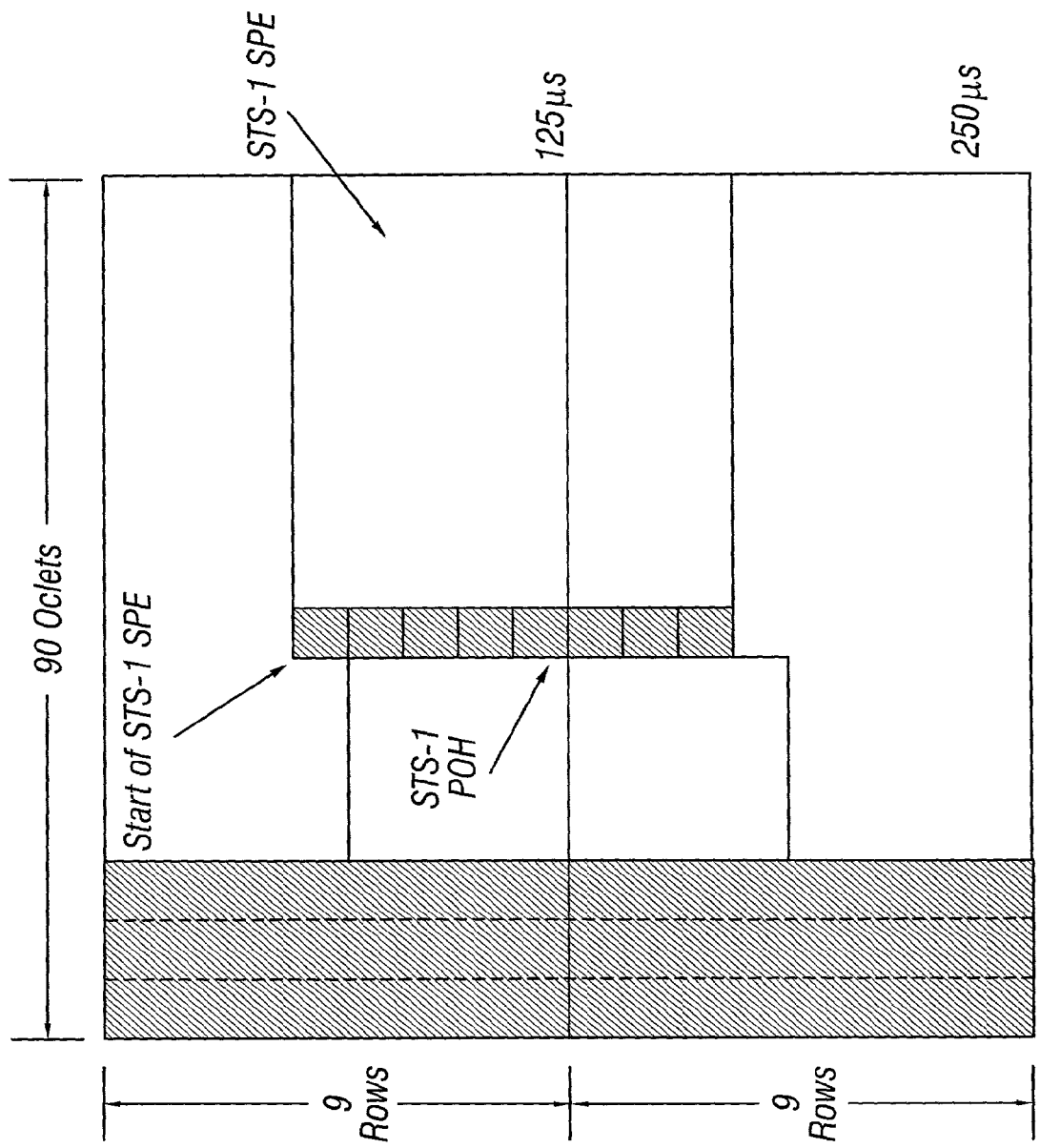
FIG. 4 depicts a prior art "floating" SPE contained within two SONET STS-1 frames.
Figure 5A:
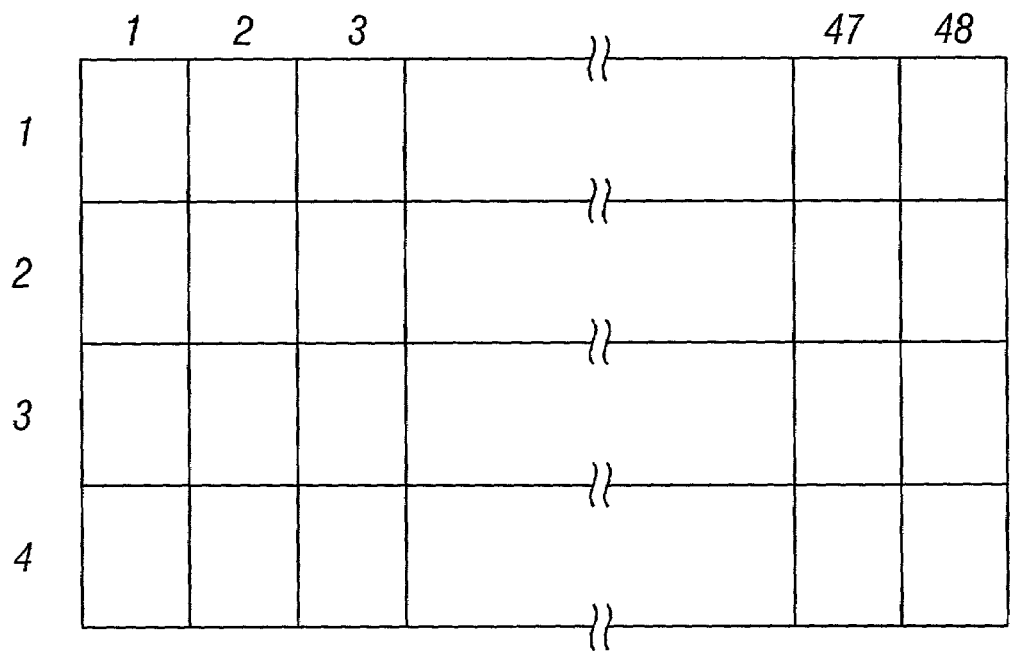
FIG. 5A illustrates a prior art 48×4 byte buffer for storing the first four path overhead bytes of SPE's contained within STS-48 SONET frames.
Figure 5B:
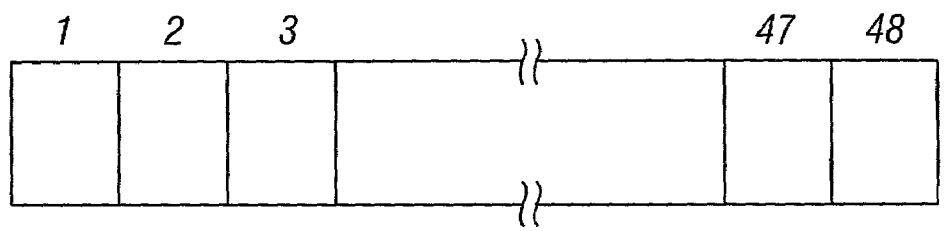
FIG. 5B shows a prior art 48×1 flag buffer for storing a flag to indicate the storage of 4 bytes of POH data in a corresponding column of the buffer of FIG. 5A.
Figure 6:
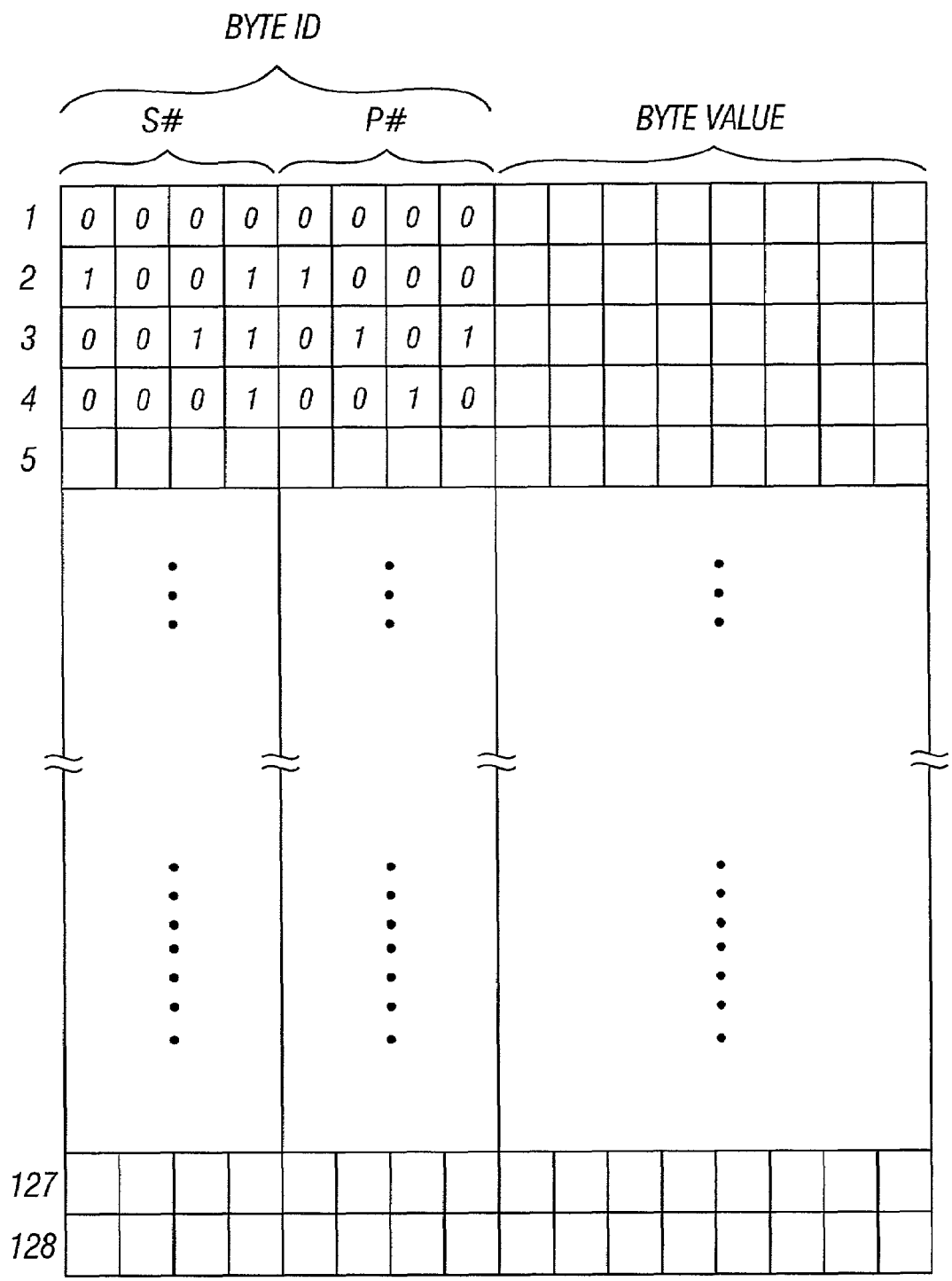
FIG. 6 illustrates a RAM FIFO buffer for storing POH information, in accordance with one embodiment of the invention.

Referring to FIG. 6, a RAM FIFO buffer is illustrated in accordance with one embodiment of the invention. The RAM FIFO buffer contains a plurality (N) of entries, each entry containing a plurality (n) of bits (e.g., 16 bits) of storage capacity. The size of each entry should be large enough to contain a byte of POH data from an incoming SPE, as well as information concerning which POH byte (0-8) of a STS-1 signal, referred to herein as the path overhead number (P#), and which STS-1 signal (for higher order STS-N signals having interleaved STS-1 signals) the POH data pertains to (e.g., 0-11 for a STS-12 signal), referred to herein as the "signal number." In the embodiment illustrated in FIG. 6, the RAM FIFO buffer contains 128 16-bit entries. Eight bits (i.e., one byte) of each entry is allocated for storage of one byte of POH data. Four bits of the remaining eight bits of each entry are allocated for storing a path overhead number (0-8) and the other four bits are allocated for storing a signal number (e.g., 0-11 for a STS-12 signal). Recall that each STS-1 interleaved signal will have nine bytes (e.g., one column) of POH data contained within its corresponding SPE and that a STS-12 signal will contain twelve interleaved STS-1 signals.

As SPE bytes are received by path terminating equipment, the received bytes are identified as either overhead bytes or user data bytes. Techniques for identifying the type of byte received are well-known in the art and need not be described in detail herein. When a POH byte is identified, it is stored in the RAM FIFO buffer. Each time a byte is stored in the RAM FIFO buffer a "tail" pointer counter is incremented. In accordance with the FIFO protocol, bytes are read out of the RAM FIFO in the order they are stored. Each time a byte is read out a "head" pointer counter is incremented. Thus, the difference between the tail pointer and the head pointer indicates the number of entries ready to be read from the FIFO. To avoid data overflow problems, bytes are read out of the FIFO prior to the FIFO becoming completely full. In one embodiment, when hardware components detect that the difference between the tail pointer and the head pointer has reached a specified value (e.g., 50), hardware will send an interrupt signal to the processor indicating that it is time to read the FIFO. In another embodiment, software periodically polls the tail and head pointer values (e.g., every 125 microseconds) to determine whether a read operation should be performed. Because data is continuously stored into the FIFO, sequentially and one byte at a time, and read out sequentially one byte at a time, the invention allows data to be read from the RAM FIFO in burst mode or direct memory access (DMA) mode. Thus, a large quantity of data may be read from the FIFO rapidly and efficiently. The prior art methods discussed above do not allow for burst-mode or DMA reads from their respective buffers.

Figure 7:
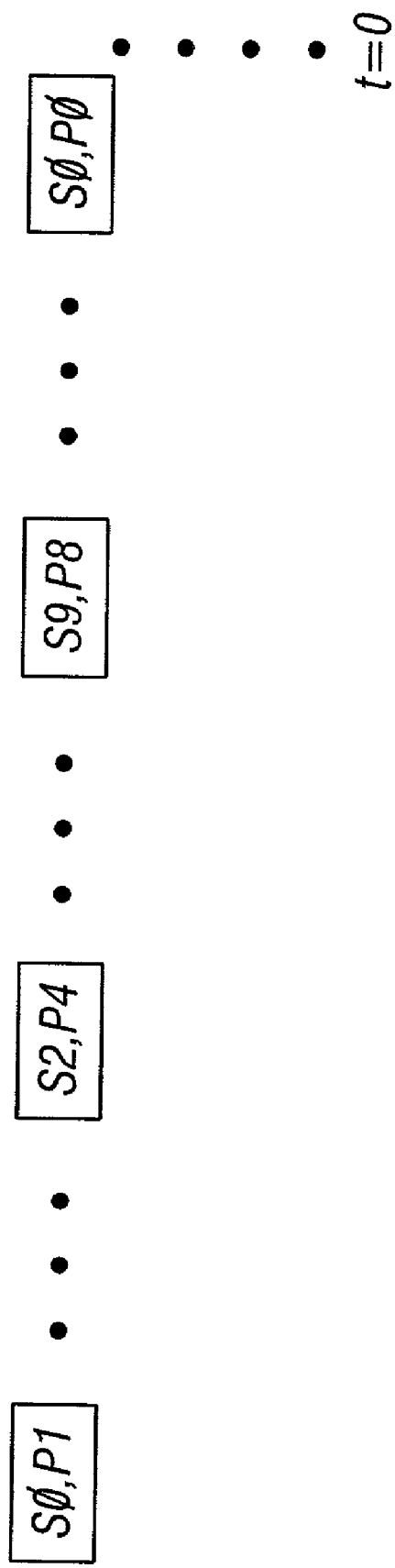
FIG. 7 symbolically illustrates a series of POH bytes, each having a STS ID and a POH ID as they are successively stored in the RAM FIFO, in accordance with one embodiment of the invention.

FIG. 7 illustrates a block diagram representation of POH bytes as they are received and stored in the RAM FIFO of the present invention. As SPE bytes are received, a first POH byte for that SPE is identified and stored in the RAM FIFO at time t=0. Imagine, for example, that the SONET frames contain payload data for twelve interleaved STS-1 signals corresponding to a STS-12 SONET frame. Due to pointer justifications, as briefly explained above, the start of the SPE, and hence the first POH byte, for each STS-1 signal may begin at various row and column locations within the STS-12 (otherwise referred to as OC-12) signal. In the example illustrated in FIG. 7, the first received POH byte is the first POH byte (P0) of the first STS-1 signal (S0) and is assigned a byte ID of 00000000, wherein the four leftmost bits indicate the signal number (S0) and the four rightmost bits indicate the path overhead number (P0).

Referring again to FIG. 6, the first entry in the RAM FIFO buffer contains all 0's in the four leftmost bits of the byte ID section which indicates that the POH byte stored in the first entry corresponds to a first STS-1 signal (SO). The four rightmost bits of the byte ID section also contains all 0's indicating that it is the first POH byte (P0) out of a possible nine POH bytes (i.e., one column of POH bytes) contained in each SPE of each STS-1 signal. Referring back to FIG. 7, the next POH byte received is the ninth POH byte (P8) of the tenth STS-1 signal (S9). Therefore, the second entry of the RAM FIFO illustrated in FIG. 6 contains 10011000, wherein the four leftmost bits store a binary value of "9" indicating that the received POH byte corresponds to the tenth STS-1 signal and the four rightmost bits store a value of "8" indicating that it is the ninth POH byte of the respective SPE. The third POH byte received and stored in the RAM FIFO is the sixth POH byte (P5) of the fourth STS-1 signal (S3). The fourth POH byte received and stored is the third POH byte (P2) of the second STS-1 signal (S1) interleaved within the STS-12 frame. Thus, the third and fourth entries of the RAM FIFO contain byte IDs of 00110101 and 00010010, respectively.

In one embodiment, POH bytes may be selectively stored in the RAM FIFO. By implementing appropriate software programming, a programmer can select a desired subset of POH bytes contained within a frame to be stored in the FIFO. For example, if only POH bytes having signal numbers 0, 2, 4, 6, 8 and 10, and path overhead numbers of 1, 3 and 5, are desired, or necessary, the system of the present invention may be programmed to store only those POH bytes within a frame. In this way, the RAM FIFO capacity is not wasted on undesired or unnecessary POH bytes and, consequently, can more efficiently store POH bytes corresponding to a greater number of frames.

As described above, four bits of the byte ID section of the RAM FIFO are allocated to indicate the signal number (S#) of the received POH byte. Since four bits can store a total of 16 binary values (0-15), they are more than adequate for storing the signal numbers of incoming POH bytes from a STS-12 signal, for example. However, if the incoming POH bytes correspond to a STS-48 signal, for example, these four bits are not sufficient for storing all the possible signal numbers of the 48 STS-1 signals (S0-S47) that may be interleaved in the STS-48 (OC-48) signal. One solution to this dilemma may be to increase the number of bits allocated for the signal number from four to six bits. This solution, however, increases the total number of bits for the byte ID of the RAM FIFO from eight to ten bits and the total number of bits for one FIFO entry will be 18 bits. Since typical bus widths for transporting data are 8, 16 or 32 bits wide, an 18-bit entry will not efficiently utilize a 32-bit bus or, alternatively, require two cycles of a 16 bit wide bus. Therefore, increasing the number of bits in the byte ID section is a less than ideal solution. The RAM FIFO architecture illustrated in FIG. 8 provides a more elegant solution to this problem.

FIG. 8 illustrates four parallel RAM FIFO buffers, each having 128 entries that are each 16 bits wide, for a total of 512 16-bit entries. For an STS-48 signal containing a first set of 48 SPEs, each having nine POH bytes, there are a total of 432 POH bytes (48×9). Therefore, the 512 entries of the parallel RAM FIFO buffers of FIG. 8 are more than enough to buffer the POH bytes of a set of 48 SPEs in a STS-48 signal. Each of the four parallel RAM FIFO buffers are identical to the single RAM FIFO buffer of FIG. 6. The four leftmost bits of the byte ID section indicate the signal number (S#) of the POH byte stored in that entry. However, since four bits are not enough to store the 48 possible signal numbers for a STS-48 signal, each of the four parallel RAM FIFO buffers are allocated to indicate two bits of information corresponding to the signal numbers of received POH bytes. For example, the first RAM FIFO buffer is assigned a binary value of "00" which functions as the two least significant bits of a signal number. Therefore, all POH bytes that have a signal number of XXXX00 would be stored in this first RAM FIFO, wherein the four leftmost bits of the byte ID store the value XXXX for each POH byte. Thus this first RAM FIFO buffer would store POH bytes having signal numbers of 0, 4, 8, 12, 16, 20, 24, 28, 32, 36, 40 and 44.

Similarly, the second RAM FIFO buffer may be assigned a binary value of "01" which functions as the two least significant bits of the signal number. Therefore, all POH bytes that have a signal number of XXXX01 would be stored in this second RAM FIFO buffer. Thus, the second RAM FIFO buffer would store POH bytes having signal numbers of 1, 5, 9, 13, 17, 21, 25, 29, 33, 37, 41 and 45. Similarly and the third and fourth parallel RAM FIFO buffers are assigned a binary value of 10 and 11, respectively. Therefore, all POH bytes that have a signal number of XXXX10 would be stored in the third RAM FIFO buffer and all POH bytes having a signal number of XXXX11 would be stored in the fourth RAM FIFO buffer. Under this scheme, the third buffer stores POH bytes having signal numbers of 2, 6, 10, 14, 18, 22, 26, 30, 34, 38, 42 and 46. The fourth buffer stores POH bytes having a signal number of 3, 7, 11, 15, 19, 23, 27, 31, 35, 39, 43 and 47. Thus, each one of the four parallel RAM FIFO buffers can store up to 12 out of the 48 possible POH bytes contained in a "frame" of a STS-48 signal. By allocating bit values to each of the four buffers, the invention can store up to 48 signal numbers for each POH byte within a 4-bit memory location, instead of requiring 6 bits. Of course, the number of parallel buffers and storage bits provided above are exemplary only and may be adjusted to accommodate higher or lower level STS-N signal formats. Additionally, other criteria may be used for storing data into each of the parallel buffers. For example, instead of assigning the two least significant bits of a POH byte's signal number, each buffer may be assigned a value corresponding to the two most signficicant bits of the signal number, or any other combination of bit(s) within the signal number.

In one embodiment, each of the parallel buffers may be accessed by respective parallel byte processing engines so that the data contained in each of the buffers may be processed in parallel. The data may be accessed from each buffer in accordance with a first-in-first-out (FIFO) protocol which is well-known in the art. In a further embodiment, the data in each buffer is accessed in accordance with a burst-mode or direct memory access (DMA) protocol which is also well-known in the art. As used herein the term "accessing" is synonymous with the term "reading" and refers to retrieving for processing data stored in a buffer or memory.

Thus, as described above, the invention provides an improved method and system for buffering SPE overhead data for processing. Storing desired POH bytes into the RAM FIFO is much simpler than prior art techniques because there is no mapping of POH bytes into corresponding buffer locations. Additionally, reading data from the RAM FIFO is simpler because hardware or software can easily determine the number of entries stored in the FIFO and initiate a read operation at appropriate times to avoid data overflow problems. These read operations can be implemented in burst mode or DMA mode which are fast and efficient. Furthermore, the invention eliminates the problem of path overhead miscorrelation caused by "corner case" pointer justification errors experienced by prior art techniques. The invention further provides flexibility and efficiency to the process of buffering and processing overhead bytes. Because the processor may be software programmed to store only desired POH bytes within a frame into the RAM FIFO, the capacity of the FIFO is not wasted on storing unnecessary POH bytes. Additionally, when reading the FIFO only desired POH bytes are retrieved and processed. Thus, the read operation is 100% efficient! Finally, the invention reduces processing limitations, buffer overflow and timing issues associated with prior art methods and devices and also reduces hardware costs by eliminating the need for dual buffers, a FPGA, and an external bus to transport buffered overhead data to the FPGA.

Those skilled in the art will know, or be able to ascertain using no more than routine experimentation, many equivalents to the specific embodiments of the invention described herein. These equivalents are intended to be encompassed by the following claims.

What is claimed is:

1. In a digital optical network, a method of buffering and reading path overhead bytes, comprising:
   identifying a plurality of path overhead bytes as they are received;
   selecting a subset of path overhead bytes from said plurality of path overhead bytes;
   determining a signal number (S#) for each byte of said subset of path overhead bytes;
   determining a path overhead number (P#) for each byte of said subset of path overhead bytes based on which one of said path overhead bytes is selected;
   storing path overhead bytes, signal numbers (S#), and path overhead numbers (P#) into a RAM FIFO buffer, wherein the RAM FIFO comprises a plurality of entries, each entry comprising a first section for storing a path overhead byte, a second section for storing a signal number (S#), and a third section for storing a path overhead number (P#); and
   reading said entries from the RAM FIFO, wherein said entries are stored and read from the RAM FIFO in accordance with a first-in-first-out (FIFO) protocol.

2. The method of claim 1 further comprising:
   incrementing a first counter each time one of said path overhead bytes is stored in one of said entries;
   incrementing a second counter for each entry that is read;
   determining when a difference in values between said first counter and said second counter reaches a specified value (N);
   generating an interrupt signal when the difference reaches N;
   transmitting the interrupt signal to a processor; and
   initiating said step of reading when the interrupt signal is received by the processor.

3. The method of claim 1 further comprising:
   incrementing a first counter each time one of said path overhead bytes is stored in one of said entries;
   incrementing a second counter for each entry that is read;
   periodically polling said first and second counters at specified time intervals to determine a difference in values between the first and second counters; and
   initiating said step of reading when the difference reaches a specified value.

4. The method of claim 1 wherein said step of reading comprises burst mode reading of entries from said RAM FIFO.

5. The method of claim 1 wherein said step of reading comprises direct memory access (DMA) reading of entries from said RAM FIFO.

6. The method of claim 1 wherein said step of storing comprises storing only path overhead bytes meeting desired criteria, wherein said desired criteria includes any combination of said signal numbers (S#) and said path overhead numbers (P#).

7. In a digital optical network, a method of buffering and reading path overhead bytes, comprising:
   identifying a plurality of path overhead bytes as they are received;
   selecting one or more bytes of said plurality of path overhead bytes;
   determining a signal number (S#) for each byte of said path overhead bytes selected;
   determining a path overhead number (P#) for each byte of said path overhead bytes selected;
   storing a first subset of said path overhead bytes, signal numbers (S#), and path overhead numbers (P#) in a first RAM FIFO buffer, wherein the first RAM FIFO includes a plurality of entries, each entry comprising a first section for storing a respective path overhead byte, a second section for storing at least a portion of a respective signal number (S#), and a third section for storing a respective path overhead number (P#), wherein said first subset of path overhead bytes have signal numbers corresponding to a first set of values;
   storing a second subset of said path overhead bytes, signal numbers (S#), and path overhead numbers (P#) in a second RAM FIFO buffer, wherein the second RAM FIFO includes a plurality of entries, each entry comprising a first section for storing a respective path overhead byte, a second section for storing at least a portion of a respective signal number (S#), and a third section for storing a respective path overhead number (P#), wherein said second subset of path overhead bytes have signal numbers corresponding to a second set of values; and
   reading said entries from the first and second RAM FIFOs, wherein entries are stored and read from each respective first and second RAM FIFO in accordance with a first-in-first-out (FIFO) protocol.

8. The method of claim 7 wherein said step of reading comprises reading said first and second RAM FIFOs in parallel.

9. The method of claim 7 wherein said step of reading comprises burst mode reading said first and second RAM FIFOs in parallel.

10. The method of claim 7 wherein said step of reading comprises direct memory access (DMA) reading said first and second RAM FIFOs in parallel.

11. The method of claim 7 wherein said steps of storing comprise storing only path overhead bytes meeting desired criteria into said respective first and second RAM FIFOs, wherein said desired criteria includes any combination of said signal numbers (S#) and said path overhead numbers (P#).

12. An apparatus for buffering path overhead bytes, comprising:
    a RAM FIFO buffer having a plurality of entries, each entry comprising a first section for storing a path overhead byte selected from a plurality of path overhead bytes for a synchronous payload envelope of a SONET frame, a second section for storing a signal number (S#) and a third section for storing a path overhead number (P#), wherein the path overhead number (P#) correlates to the path overhead byte stored in the first section for the synchronous payload envelope of the SONET frame.

13. The apparatus of claim 12 wherein each entry of said plurality of entries comprises sixteen bits of storage capacity, said first section comprises eight bits of storage capacity, said second section comprises four bits of storage capacity, and said third section comprises four bits of storage capacity.

14. The apparatus of claim 12 further comprising:
    a first counter that is incremented each time one of said path overhead bytes is stored in one of said entries; and
    a second counter that is incremented for each of said entries that is read from said RAM FIFO.

15. An apparatus for buffering path overhead bytes, comprising:
    a first RAM FIFO buffer having a first plurality of entries for storing a first set of path overhead bytes derived from a group of one or more bytes selected from a plurality of path overhead bytes for a synchronous payload envelope of a SONET frame, wherein each of said first plurality of entries comprises a first section for storing a path overhead byte, a second section for storing at least a portion of a signal number (S#), and a third section for storing a path overhead number (P#), wherein the path overhead number (P#) correlates to the first set of path overhead bytes stored for the synchronous payload envelope of the SONET frame; and a second RAM FIFO buffer having a second plurality of entries for storing a second set of path overhead bytes derived from one or more bytes of said plurality of path overhead bytes for said synchronous payload envelope, wherein each of said second plurality of entries comprises a first section for storing a path overhead byte, a second section for storing at least a portion of a signal number (S#), and a third section for storing a path overhead number (P#) that correlates to which path overhead byte of said synchronous payload envelope is stored, wherein said first set of path overhead bytes correspond to a first set of signal numbers and said second set of path overhead bytes correspond to a second set of signal numbers.

16. The apparatus of claim 15 wherein each entry of said first and second plurality of entries comprises sixteen bits of storage capacity, each of said first sections comprises eight bits of storage capacity, each of said second sections comprises four bits of storage capacity, and each of said third sections comprises four bits of storage capacity.

17. The apparatus of claim 15 further comprising:
a first counter that is incremented each time data an entry is stored in one of said first and second RAM FIFO; and
a second counter that is incremented for each entry that is read from said first and second RAM FIFOs.

* * * * *